Nov. 3, 1936. L. KIMBALL 2,059,364
THROTTLE VALVE
Filed Nov. 30, 1935
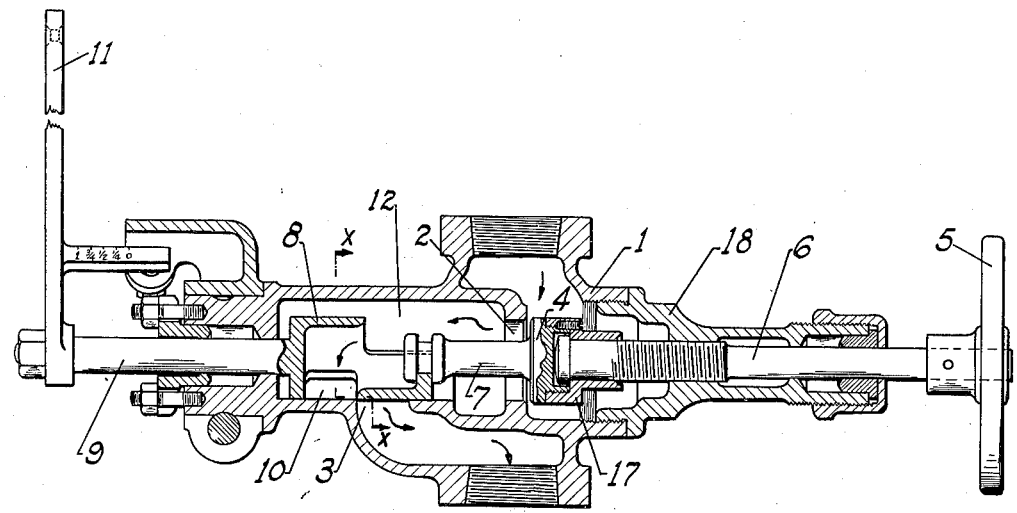
FIG. 1
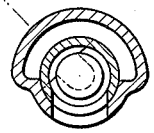 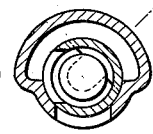
OPEN    CLOSED
SECTION "X-X"
FIG. 4    FIG. 5
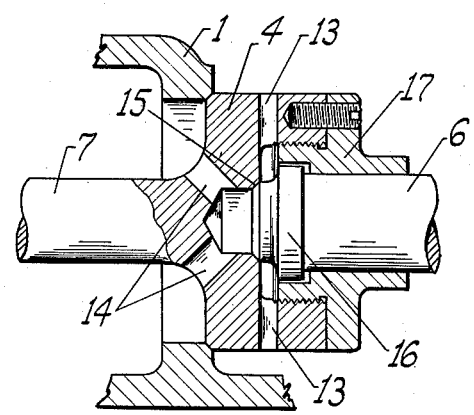
FIG. 2
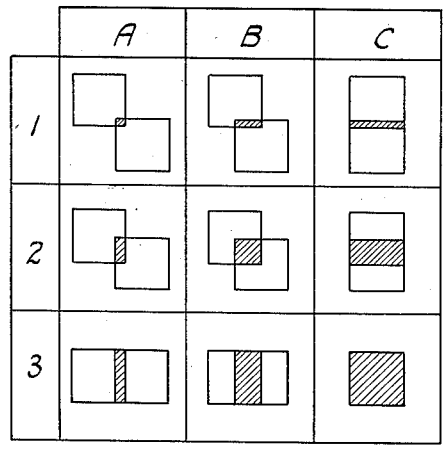
FIG. 3
Linwood Kimball
INVENTOR.

Patented Nov. 3, 1936

2,059,364

UNITED STATES PATENT OFFICE 2,059,364

THROTTLE VALVE

Linwood Kimball, Danvers, Mass., assignor to Ruggles-Klingemann Mfg. Co., Salem, Mass.

Application November 30, 1935, Serial No. 52,367

11 Claims. (Cl. 277—31)

My invention relates to improvement in throttle valves of the type commonly used in connection with pressure responsive devices for automatic control.

The present invention is a continuation in part of application Serial Number 753,005 filed November 14, 1934, and relates in general to throttle valves which may be both automatically and manually controlled in the regulation of steam, water, or gas.

The primary object of the invention is to provide a combination manually operated stop valve and valve for automatic control all in the same valve casing and so arranged that the stop valve, in addition to providing tight seating means, also includes means for controlling the degree of adjustment of the automatically controlled valve whereby the volume of fluid may be limited without limting the degree of movement as controlled from the automatic controlling means.

Another object is to prevent cutting action of the seats of the manually controlled valve by separating the seats in advance of the opening of the port controlled by the automatically controlled valve and to provide, for all opening and closing movement, an excess area through the manual stop valve over that of the automatically controlled valve, which would be effective in reducing the velocity flow across the seats of the manually controlled valve, and therefore minimize cutting action.

Valves of the lever operated rotary type are extensively used in the control of a condition such as pressure, temperature, or water level, such valves being controlled by means of pressure responsive device, thermostat control or floats as the requirements may be.

In order to avoid a condition of over correction, it has been found good practice, to provide means to adjust the position of the valve longitudinally to close the opening through the valve to any desired degree. Such a valve is shown in Patent Number 1,345,518 issued to John Van Brunt July 6, 1920.

Valves of the Van Brunt type are for regulating the volume flow and are not sufficiently tight when closed to fill the requirements of a stop valve.

In my present invention I have included the stop valve within the casing of the automatically controlled valve. The arrangement being such that the stop valve in addition to providing tight closing means also includes means for adjusting the regulating valve to limit its effective area and volume flow.

These and other objects of the invention will be explained in the following specifications and in connection with the accompanying drawing in which Fig. 1 shows a vertical sectional view of my invention. Fig. 2 shows an alternate arrangement of pilot valve control in the valve disc, a construction adapted to valves of the larger size, which permits balancing the pressure on the valve disc before opening. Fig. 3 shows diagram of the port area adjustment of the automatically controlled valve with relation to opening and closing movement of the manually operated valve. Figs. 4 and 5 show a cross section of the rotary valve in its open and closed position.

Referring now to Fig. 1 the flow through the valve is in the direction indicated by the arrows, valve casing (1) has an orifice (2) and a port (3) through which fluid under pressure must pass from the inlet to the outlet of the valve casing.

Valve disc (4), valve stem (6), hand wheel (5) and valve bonnet (18) constitute a manually operated valve adapted to seat over an orifice (2) leading from the inlet of the valve casing to a chamber (12) located intermediate between the inlet and outlet of the valve casing (1), and is hereafter referred to as the stop valve, a rotary valve (8) having valve stem (9) and operating lever (11) controls the discharge from the intermediate chamber (12) to the valve casing outlet and will hereafter be referred to as the regulating valve. Valve disc (4) has an extension (7) adapted to engage the regulating valve (8) with a swivel connection thereon, the arrangement being such that regulating valve (8) and stem (9) is adjusted longitudinally by the opening and closing movement of valve disc (4).

This adjustment effected by hand wheel (5) regulates the amount of port area registering between the port (10) in the rotating valve (8) and port (3) in the valve casing as illustrated in diagram Fig. 3.

In the operation of a valve of this character the valve disc (4) is first opened allowing pressure to equalize in chamber (12) after which the flow is regulated through the port (3) and the high velocity flow and consequent cutting action takes place on the closing edges of the rotary valve (8) instead of on the ground seats of the valve disc (4) seating over orifice (2). In other words, the valve seats are separated a sufficient amount, before throttling action takes place through the ports, to insure a relatively slow velocity flow past the seats as compared with that through the port (3) and this excess area through the stop valve, in relation to that through the ports, is maintained for all degrees of valve opening.

Now, referring to Fig. 2 I have illustrated a valve disc having by-pass ports (13) and (14) through the disc, and flow through these passages being controlled by valve stem (6). In this arrangement the first opening movement by the hand wheel (5) opens communication through these ports thereby allowing pressure to enter the chamber (12) and balance the pressure on the valve disc (4) after which the valve can be opened with a minimum of effort. The addition of this feature is desirable with high pressure or with valves of large size.

The end of the valve stem (6) seats on the valve disc (4) at (15) making a tight valve when stop valve disc (4) is closed, there being sufficient lost motion between the shoulder (16) and the cap (17) to allow for the necessary by-pass opening to fill the chamber (12).

In the rotating valve (8) the drawing shows this valve as a cylindrical shell with parts cut away to act as ports to permit flow through the valve by the operation of lever (11) when the stop valve disc (4) is open sufficiently to uncover the ports. However, I wish to have it understood that any construction which will effect the opening and closing of a port or ports through the valve by the rotation of stem (9) when taken in conjunction with the other novel features of this valve is within the scope of my invention.

It should also be understood that the embodiments shown is primarily for the purpose of illustrating the principles of the invention, and that the arrangement of ports and details of construction may be modified or changed by those skilled in the art without departing from the spirit or scope of the invention.

I claim:—

1. In a valve structure of the character described comprising a valve casing having inlet and outlet chambers and an intermediate chamber between the inlet and outlet chambers, a valve adapted to close communication between the inlet chamber and the intermediate chamber, a second valve adapted to close communication between the intermediate chamber and the outlet chamber, means operated by the first named valve to adjust the position of the second named valve, and means to operate the second named valve independent of the first named valve.

2. In a valve structure of the character described comprising a valve casing having an inlet and an outlet, a chamber between the inlet and the outlet, a valve adapted to close communication between the inlet and said chamber, a second valve adapted to close said chamber to the outlet of said casing, means to open and close the first named valve, means due to the opening and closing movement to adjust the opening of the second named valve, and means to open and close the second named valve in its adjusted position independent of the operation of the first named valve.

3. In a valve structure of the character described comprising a valve casing having an inlet and an outlet for the passage of fluid under pressure, a chamber intermediate between the inlet and the outlet through which said fluid must pass, a seated valve controlling the admission of fluid from the inlet to said chamber, a rotating valve in said chamber adapted to regulate the discharge of fluid from said chamber to the outlet of said casing, means to open and close the first named valve and means due to the opening and closing movement to longitudinally adjust the second named valve to limit the effective area through said valve.

4. In a valve structure of the character described comprising a valve casing having an inlet and an outlet, a chamber intermediate between the inlet and the outlet, a seated stop valve adapted to close the passage leading from the inlet to said chamber, a regulating valve adapted to control a port, leading from said chamber to the outlet of said casing, means to rotate said valve to open and close said port, and means to longitudinally adjust said valve by the positioning of the first named valve to control the amount of port area registering between the second named valve and said port.

5. In a valve structure of the character described comprising a valve casing having an inlet and an outlet for the passage of fluid under pressure, a chamber intermediate between the inlet and the outlet through which said fluid must pass, a seated stop valve controlling the admission of fluid from the inlet to said chamber, a regulating valve adapted to be rotated for controlling the opening and closing of a port leading from said chamber to the outlet of said casing, means to rotate said valve to open and close said port, and means to longitudinally adjust said valve by the positioning of the first named valve to control the amount of port area registering between the second named valve and the port in the outlet of said chamber.

6. In a valve structure of the character described, comprising a valve casing having an inlet and an outlet for the passage of fluid under pressure, a chamber intermediate between the inlet and the outlet through which said fluid must pass, a seated valve controlling the admission of fluid from the inlet to said chamber, a rotary valve controlling the discharge of said fluid from said chamber to the outlet of said valve, means to open and close the first named valve, means due to the opening and closing movement to longitudinally adjust the second named valve, and means to rotate the second named valve to open and close said valve independent of the operation of the first named valve.

7. In a valve structure of the character described, comprising a valve casing having an inlet and an outlet, a chamber between the inlet and the outlet, a valve adapted to close the inlet to said chamber, a second valve within said chamber adapted to close said chamber to the outlet of said casing, an operative connection between the two valves the arrangement being such that the second named valve is closed in advance of the first named valve, and means to operate the second named valve independent of the operation of the first named valve.

8. In a valve structure of the character described comprising a valve casing having an internally disposed chamber with inlet orifice and outlet port, a stop valve adapted to seat over the inlet orifice, a regulating valve operated by the stop valve adapted to close said port in advance of the seating of the stop valve, means to rotatably operate said regulating valve independent of the operation of the stop valve to open and close said port, and means for longitudinally adjusting said regulating valve by the degree of opening of the first named valve to limit the effective area through said port when said regulating valve is rotated to an open position.

9. In a valve structure of the character described comprising a valve casing having an inlet and an outlet for the passage of fluid under pressure, a pressure chamber intermediate between the inlet and outlet, a stop valve controlling admission of fluid pressure from the inlet to said chamber, a regulating valve in said chamber operated by the stop valve adapted to control the discharge of fluid pressure from said chamber to the outlet of said casing, the arrangement being such that the regulating valve is closed in advance of the stop valve, means for operating the stop valve which includes a by-pass valve for equalizing the pressure in the pressure chamber before opening the said valve, means to rotatably operate the regulating valve independent of the stop valve, and means for longitudinally adjusting said regulating valve by the degree of opening of the first named valve for limiting the discharge of fluid pressure from said chamber to the outlet of said casing when the regulating valve is rotated to its open position.

10. In a valve structure of the character described, comprising a valve casing having an inlet and an outlet, a chamber intermediate between the inlet and the outlet, a valve controlling the inlet to said chamber from the inlet of said casing, a second valve controlling the outlet from said chamber to the outlet of said casing, means to open and close the first named valve, means due to the opening and closing movement to adjust the position of the second named valve, and means to open and close the second named valve independent of the operation of the first named valve, the arrangement being such that the effective area through the second named valve is less than that of the first named valve for all degrees of adjustment of either valve.

11. In a valve structure of the character described comprising a valve casing having opposite end chambers and a chamber intermediate between the two end chambers, a valve adapted to close communication between one of said end chambers and the intermediate chamber, a second valve adapted to close communication between the intermediate chamber and the other end chamber, means to open and close the first named valve, means due to the opening and closing movement to adjust the opening of the second named valve, and means to open and close the second named valve in its adjusted position independent of the operation of the first named valve.

LINWOOD KIMBALL.